United States Patent Office 3,365,426
Patented Jan. 23, 1968

3,365,426
POLYAMIDE CARBAMATE RESINS PREPARED FROM 1-(2-HYDROXYALKYL)-2-IMIDAZOLIDINONES AND ORGANIC POLYISOCYANATES
Wilhelm E. Walles, Midland, Mich., assignor to The Dow Chemical Company, Midland, Mich., a corporation of Delaware
No Drawing. Filed Jan. 24, 1964, Ser. No. 339,873
9 Claims. (Cl. 260—77.5)

ABSTRACT OF THE DISCLOSURE

Resinous polyamide carbamate products are produced by reacting 1-(2-hydroxyalkyl)-2-imidazolidinones and organic polyisocyanates in substantially equimolar proportions. The reactants are dissolved in an inert organic solvent such as dioxane and reacted in the presence of a suitable catalyst such as triethylamine at a temperature in the range of 20° to 300° C. The resulting resins have high melting point and low solubility in organic solvents and are useful to make combs and toothbrush handles.

The present invention relates to new compositions of matter and to a method for preparing the same. More particularly, it relates to novel polyamide carbamate resins and to a method for their preparation.

An object of this invention is to provide a new class of chemical compounds from polyisocyanates and 1-(2-hydroxyalkyl)-2-imidazolidinones. A particular object is the provision of novel high molecular weight polyamide carbamate resins which have high melting points and low solubility in most solvents. Other objects and advantages of this invention will appear hereinafter.

These objects are accomplished in accordance with the present invention by providing resinous reaction products of certain 1-(2-hydroxyalkyl)-2-imidazolidinones and organic polyisocyanates. The 1-(2-hydroxyalkyl)-2-imidazolidinones have the general formula:

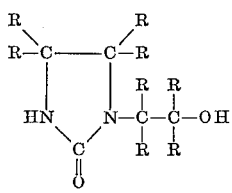

wherein each R is independently selected from the group consisting of hydrogen and alkyl radicals having 1 to 8 carbon atoms, the sum of all substituted carbon atoms being no greater than 12. The preferred materials are those imidazolidinones having not more than one alkyl radical in either the 4-position or the 5-position, i.e., at least one R in each of these positions is hydrogen. The most preferred materials are the 5-alkyl imidazolidinones, especially those wherein the alkyl radical contains up to 8 carbon atoms.

Representative examples of the 1-(2-hydroxy-alkyl)-2-imidazolidinones preferred in this invention are 1-(2-hydroxyethyl)-2-imidazolidinone,
1-(2-hydroxyethyl)-5-methyl-2-imidazolidinone,
1-(2-hydroxypropyl)-5-ethyl-2-imidazolidinone,
1-(2-hydroxybutyl)-5-propyl-2-imidazolidinone,
1-(2-hydroxybutyl)-4-butyl-2-imidazolidinone,
1-(2-hydroxypentyl)-4,5-dimethyl-2-imidazolidinone,
1-(2-hydroxy-1-methylpropyl)-4,5-dimethyl-2-imidazolidinone,
1-(2-hydroxy-1-ethylbutyl)-4,5-diethyl-2-imidazolidinone, and
1-(2-hydroxy-1,1,2-trimethylpropyl)-4,4,5,5-tetramethyl-2-imidazolidinone.

Any of a wide variety of organic polyisocyanates may be employed to react with the 2-hydroxyalkyl imidazolidinones to prepare the polyamide carbamate resins of the present invention including aromatic, aliphatic and cycloaliphatic polyisocyanates and combinations of those types. It is to be understood that mixtures of two or more organic polyisocyanates and two or more 1-(2-hydroxyalkyl)-2-imidazolidinones may be used. Representative polyisocyanates include tolylene-2,4-diisocyanate,
m-phenylene diisocyanate,
4-chloro-1,3-phenylene diisocyanate,
4,4'-biphenylene diisocyanate,
1,5-naphthylene diisocyanate,
1,4-tetramethylene diisocyanate,
1,6-hexamethylene diisocyanate,
1,10-decamethylene diisocyanate,
1,4-cyclohexylene diisocyanate,
4,4'-methylene-bis-(cyclohexyl isocyanate),
1,5-tetrahydronaphthylene diisocyanate and
4,4',4''-triphenylmethane triisocyanate.

Arylene diisocyanates, i.e., those in which each of the two isocyanate groups is attached directly to an aromatic ring, are preferred.

The 1-(2-hydroxyalkyl)-2-imidazolidinones of the present invention can be prepared by the pyrolysis of the corresponding 2-oxazolidinones as described in my copending application with Stanley S. Leff, Ser. No. 275,487, filed Apr. 25, 1963, now U.S. Patent 3,248,399.

In the preparation of the novel resins in general, the polyisocyanate and 1 - (2 - hydroxyalkyl)-2-imidazolidinones as defined above are usually dissolved in a suitable organic liquid medium such as dioxane or tetrahydrofurane. The solutions are stirred together in the presence of a suitable catalyst at a temperature between 20° and 300° C., preferably between 50° and 100° C. Representative examples of suitable catalysts which may be employed for the condensation reaction include triethylamine, dibutyl tin dilaurate, N,N-dimethylcyclohexylamine, triethylene diamine, cobalt naphthenate and stannous octoate.

It is preferred to employ the 1-(2-hydroxyalkyl)-2-imidazolidinone and polyisocyanate in substantially equimolar proportions although an excess of either reactant may be employed if desired. The resin product separates from the solution and is removed therefrom by precipitation. After separating and drying, a relatively high molecular weight resin is obtained which has a melting point between 200° C. and 300° C. and is sparingly soluble in aqueous and most organic solvents.

The high melting point and low solubility of the resins makes them useful as structural materials, as for example, combs, tooth brush handles, and also for coatings and as resin binder components for paints and lacquers.

The practice of the invention is illustrated by, but not limited to, the following example.

EXAMPLE

To a two liter resin kettle, equipped with a water condenser, stirrer, dropping funnel and thermometer, there was added 158.2 grams (1 mole) of 1-(2-hydroxypropyl)-5-methyl-2-imidazolidinone and 450 cc. of dioxane under a slow $N_2$ purge which was maintained throughout the course of the reaction. The charge was agitated slowly to completely dissolve the imidazolidinone. The resin flask was immersed in ice to cool the reactants, and to the cooled solution there was added dropwise 174.15 grams (1.0 mole) of an 80/20 mixture of 2,4- and 2,6-tolylene diisocyanate predissolved in 250 cc. of dioxane. When the addition was complete, the temperature of the reaction mass was gradually, over a period of two hours, raised to 55° C. At the termination of this period, 3.32 grams triethylamine (1% based on monomers) was added to the reaction mass and the temperature maintained at 55–56° C. for 7 hours, followed by one hour at 101° C. Over this period of time, a peach colored solid precipitated out of the reaction mass. The precipitated polymer was filtered off, washed with ether and then dried. About 322 grams of the polymer was collected which represented a 97% yield of the polyamide carbamate. Analysis of the resin confirmed the identity of the polyamide carbamate having the structural formula:

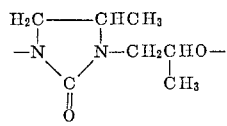

wherein

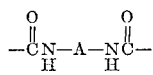

is a divalent radical arising from the starting tolylene diisocyanate, —A— being the divalent tolylene radical —$C_6H_3(CH_3)$—, and —B— is the divalent radical

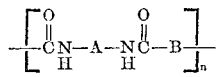

arising from the 1-(2-hydroxypropyl)-5-methyl-2-imidazolidinone; $n$ indicates that the defined sequence is repeated a number of times in the molecular structure of the resin.

The analysis was as follows:

| Analysis (percent) | C | H | N | O |
|---|---|---|---|---|
| Found | 57.82 | 6.07 | 16.86 | 19.26 |
| Calculated | 57.13 | 6.56 | 15.67 | 19.65 |

The polyamide carbamate was found to be soluble in m-cresol and had a solubility of less than 1% in acetone, water, ether and dioxane.

The polyamide carbamate was found to have a Fikentscher K-value of about 25 when determined in 1% m-cresol. The Fikentscher K-value of a commercial nylon resin (Zytel, Du Pont) was found to be about 22 by this method, indicating that the polyamide carbamate had a molecular weight of the same order (slightly higher) as the commercial resin.

The polyamide carbamate melted at 215° C. and decomposed with an evolution of gas at 285° C.

In place of the 1-(2-hydroxypropyl)-5-methyl-2-imidazolidinone employed in the polymerization procedure of the above example, there can be substituted any equivalent amount of any of the other mentioned (2-hydroxyalkyl) imidazolidinones, for example, 1-(2-hydroxyethyl)-2-imidazolidinone to give a resin condensation product of 1-(2-hydroxyethyl)-2-imidazolidinone and tolylene diisocyanate; 1-(2-hydroxybutyl)-4-butyl-2-imidazolidinone to give a resin condensation product of 1-(2-hydroxybutyl)-4-butyl-2-imidazolidinone and tolylene diisocyanate, to obtain a generally similar final product as shown in the above example.

What is claimed is:

1. A composition of matter comprising a resinous polyamide carbamate prepared by reacting at 20°–300° C., in an inert solvent and in the presence of a catalyst, equimolar portions of (1) a 1-(2-hydroxyalkyl)-2-imidazolidinone having the general formula:

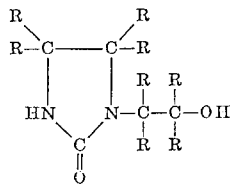

wherein each R is a radical independently selected from the group consisting of hydrogen and alkyl radicals having from 1 to 8 carbon atoms, the total number of carbon atoms in such substituent radicals R being not more than 12, with (2) an organic isocyanate selected from the group consisting of aromatic, aliphatic and cycloaliphatic polyisocyanates and combinations thereof.

2. The composition of matter according to claim 1 in which the 1-(2-hydroxyalkyl)-2-imidazolidinone is 1-(2-hydroxypropyl)-5-methyl-2-imidazolidinone.

3. The composition of matter according to claim 1 in which the organic isocyanate is tolylene diisocyanate.

4. The composition of matter according to claim 1 in which the 1-(2-hydroxyalkyl)-2-imidazolidinone is 1-(2-hydroxy propyl)-5-methyl-2-imidazolidinone and the organic isocyanate is tolylene diisocyanate.

5. A process for the preparation of polyamide carbamate resins which comprises reacting at 20–300° C., in an inert solvent, and in the presence of a catalyst equimolar portions of a 1-(2-hydroxyalkyl)-2-imidazolidinone having the general formula:

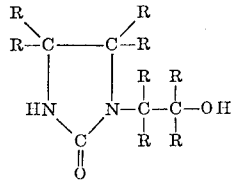

wherein each R is a radical independently selected from the group consisting of H and alkyl radicals having from 1 to 8 carbon atoms, the total number of carbon atoms in such substituent radicals R being not greater than 12, with an organic isocyanate selected from the group consisting of aromatic, aliphatic and cycloaliphatic polyisocyanates and combinations thereof.

6. The process according to claim 5 in which the 1-(2-hydroxyalkyl)-2-imidazolidinone is 1-(2-hydroxypropyl)-5-methyl-2-imidazolidinone.

7. The process according to claim 5 in which the organic isocyanate is tolylene diisocyanate.

8. The process according to claim 5 in which the reaction temperature is between 50°–100° C.

9. The process according to claim 5 in which the catalyst is triethylamine.

References Cited

UNITED STATES PATENTS 2,801,230 7/1957 Fraser et al. _____ 260—77.5
3,248,399 4/1966 Walles et al. _____ 260—309.7

DONALD E. CZAJA, *Primary Examiner.*

F. McKELVEY, *Assistant Examiner.*